Nov. 14, 1961     L. F. FELLOWS     3,008,255
ANIMATED DISPLAY DEVICE
Filed June 6, 1958     3 Sheets-Sheet 1
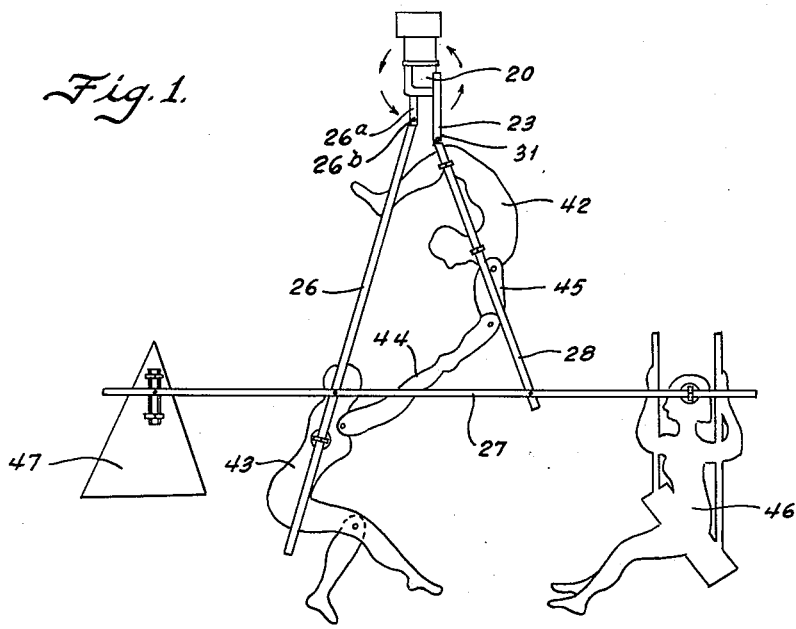
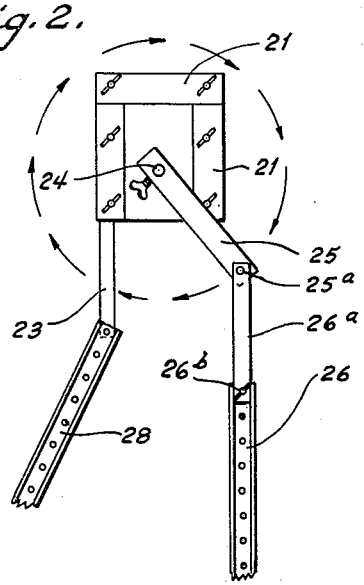
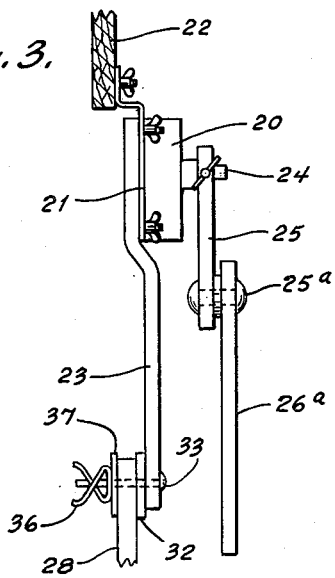
INVENTOR.
LEONARD F. FELLOWS
BY
*Albert M. Parker*
ATTORNEY.

Nov. 14, 1961 L. F. FELLOWS 3,008,255
ANIMATED DISPLAY DEVICE
Filed June 6, 1958 3 Sheets-Sheet 2
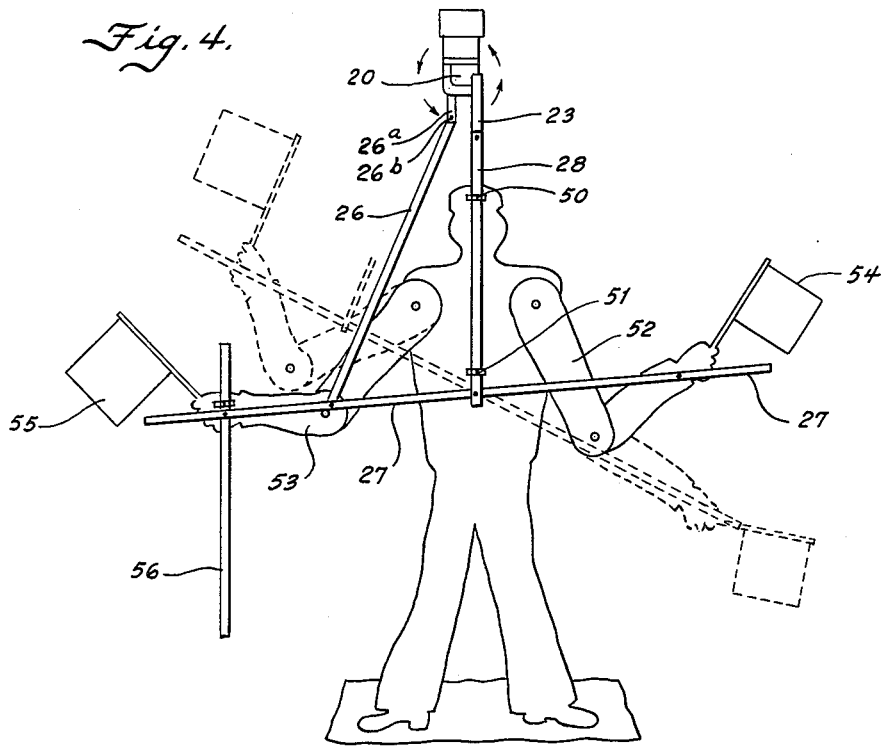
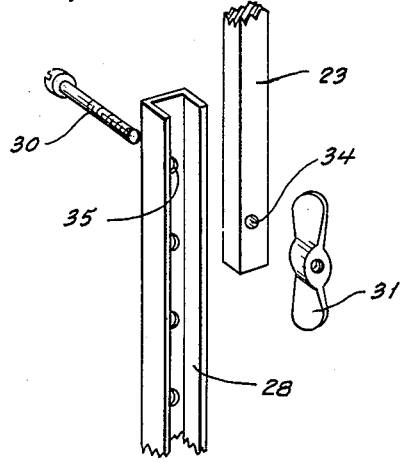
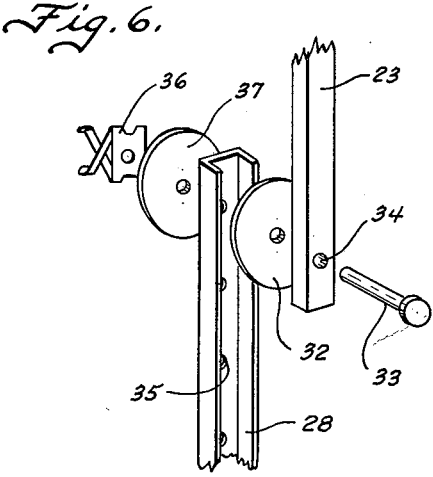
INVENTOR.
LEONARD F. FELLOWS
BY
Albert M. Parker
ATTORNEY.

Nov. 14, 1961 — L. F. FELLOWS — 3,008,255
ANIMATED DISPLAY DEVICE
Filed June 6, 1958 — 3 Sheets-Sheet 3
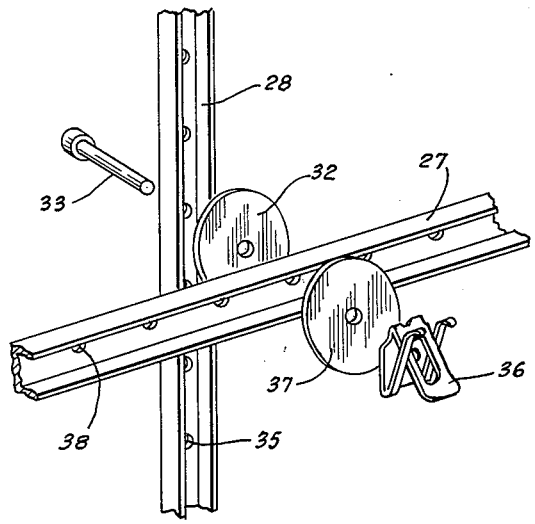
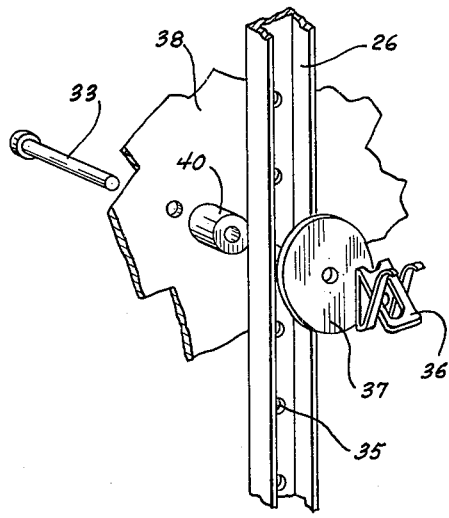
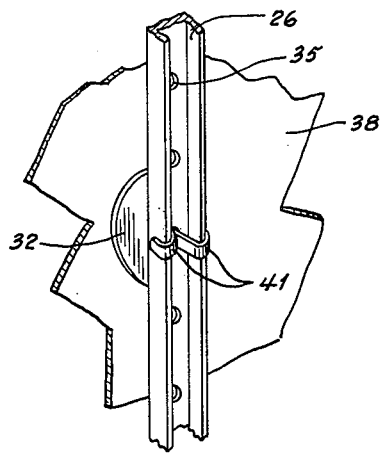
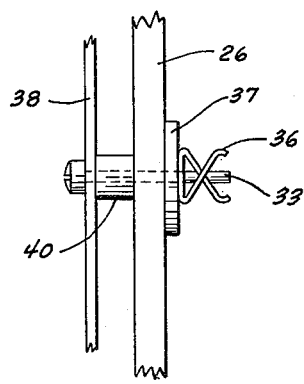
INVENTOR.
LEONARD F. FELLOWS
BY
ATTORNEY.

3,008,255
ANIMATED DISPLAY DEVICE
Leonard F. Fellows, Chappaqua, N.Y., assignor to McCann-Erickson Incorporated, New York, N.Y., a corporation of Delaware
Filed June 6, 1958, Ser. No. 740,442
5 Claims. (Cl. 40—106.41)

This invention relates to an animated display device which can be readily manually altered to produce a large number and variety of motions. The invention has particular reference to a display device which can be used in shop or other windows, or wherever display pieces are used, to attract attention or to display some function or characteristic of an article for sale.

It is well known that animated displays are considerably more effective as advertising means that stationary ones. However, due to the comparative cost of animated displays over stationary ones, the use of the animated type has been limited. The basic animated display device herein described not only is inexpensive though requiring only a single electric motor, or oscillator, but much more so because it can be used over and over again for a large number of alternate display arrangements, each different from the other.

It is, accordingly, one of the objects of this invention to provide an improved adjustable display device which avoids one or more of the disadvantages and limitations of prior art arrangements.

Another object of the invention is to reduce the cost of animated display devices.

Another object of the invention is to provide a display which can be assembled in a wide variety of arrangements and capable of a wide variety of movements.

Another object of the invention is to simplify the assembly and disassembly of display devices so that such can be effected without the use of tools.

The invention as illustrated herein includes a single electric motor having a crank arm which provides all the motion for the display. Secured to the motor housing is a short bar for holding a longer rod to which is fastened a major portion of the display. The crank arm is pivotally connected to a second rod which also holds a portion of the display and transmits motion thereto. A horizontal rod is secured to the other two rods and generally supports movable display components. With slight modification of the arrangement, that would be apparent to those skilled in the art, suitable oscillating means could be employed in place of the motor.

For a further understanding of the nature and objects of the present invention, reference is made to the following description taken in connection with the accompanying drawings in which—

FIG. 1 is a back view of the display device showing one arrangement of the display components.

FIG. 2 is a front view of the electric motor showing the rotary crank arm and various rods.

FIG. 3 is a side view of the same.

FIG. 4 is a back view of the display device showing another arrangement of components.

FIG. 5 is an exploded isometric view of one of the joints which attaches the motor bar to a vertical rod in a rigid manner.

FIG. 6 is an exploded isometric view of the same components shown in FIG. 5 but indicating how they may be joined to pivot the rod on the motor bar.

FIGS. 7 and 8 are exploded isometric views showing how various components may be joined in pivot relationship.

FIG. 9 is an isometric view of a portion of a visual display joined to a vertical rod by a common spreadable brass fastener.

FIG. 10 is a side view of the pivot arrangement shown in FIG. 8.

Referring now to FIGS. 1, 2 and 3, the display device as illustrated includes a motor 20, secured to a base 21. The base 21 may be fastened to any convenient support such as a wooden beam 22 as indicated in FIG. 3. At the rear of the base 21 a vertical short bar 23 is secured and extends downwardly to act as a support for other components. A shaft 24, which may be the shaft of the motor itself or may be a jack shaft coupled to the motor by a reduction gearing, supports and turns a crank arm 25 which revolves with the shaft and is pivotally connected at 25a to a short bar 26a which in turn is fixedly connected at 26b to a long rod 26, to which portions of the display are secured, as well as the generally horizontal rod 27. The purpose of employing the short bar 26a is so that a machine made fitted pivot can be employed at 25a to eliminate whip and keep the swinging from deviating from the desired path. To the short bar 23 a second vertical rod 28 is either pivotally or fixedly secured. This rod 28 is in turn pivotally attached to horizontal rod 27. For strength, to provide rigidity in long lengths, and for convenience in assembly, the rods 26, 27 and 28 are formed with a U-shaped cross section as shown in FIGS. 5 to 9.

When the stationary bar 23 is to be rigidly fixed to rod 28, the fastening means shown in FIG. 5 is employed. The bar 23 is made to fit into the channel portion of the rod 28 and is secured therein by means of a threaded bolt 20 and a wing nut 31. Such fastening means is used in the display shown in FIG. 4.

When the stationary bar 23 is to be pivotally joined to the rod 28 the fastening means shown in FIG. 6 is employed. A disk washer 32 is placed between the bar 23 and the rod 28 and an unthreaded pin 33 is inserted in a hole 34 in the bar 23, through the center of washer 32, through one of the holes 35 in rod 28, and is secured by a pinch spring fastener 36. A second washer 37 may be used as shown but is not necessary. This type of fastening means is shown in assembled form (side view) in FIG. 3.

The pivoted joints between the horizontal rod 27 and the vertical rods 26 and 28 are effected as shown in FIG. 7 where the pin 33 is inserted through one of the holes 35 in rod 28 through the washer 32, through one of the holes 38 in the rod 27, through the washer 37 and is secured by the pinch fastener 36. The washers 32 and 37 are employed to assure free pivotal movement and to prevent interference of extending portions of the movable components.

Various types of display figures and signs may be secured to the rods. Though for the purpose of illustrating the invention figures and signs are generally shown as flat in shape, made of cardboard, fiber, or some similar material, it is, of course, to be understood that three dimensional elements or elements of irregular formation can be as readily employed. When such display signs are attached to more than one rod, spacers are necessary to set off the flat signs when pivotally attached to a rod moving in a plane behind the plane of the sign. FIGS. 8 and 10 show the details of such fastening means including spacers. The flat sign element 38 is held in place by a pin 33 which is inserted in a hole in the sign and passes through a cylindrical spacer 40, a hole 35 in the channel 26, a washer 37, and is secured by the spring pinch fastener 36.

A fixed mounting for a sign is shown in FIG. 9 where the sign material 38 is held by a spreadable fastener having two flat tines 41 attached to a round head. The tines are inserted into a hole in the sign, through a washer 32, a selected hole 35 in a channel 26, and then their free ends are bent around the channel edges as shown in FIG. 9.

Many types of display arrangements are possible with this basic display form. By way of illustration, one of these is shown in FIG. 1 where a likeness of an acrobat 42 is secured to the rod 28 by two fasteners similar to the one shown in FIG. 9. A second figure 43 is pivotally fastened to the lower part of the rod 26 and the two figures are joined by members 44 and 45, bearing the likeness of arms and pivotally mounted to their body parts as shown. A third figure 46 is pivotally mounted to the horizontal rod 27 near one end thereof and swings when the display is in motion. Other signs and figures may be mounted pivotally or fixedly secured to other portions of the display, such as the sign element 47. As mentioned above, in the FIG. 1 display arrangement, the rod 28 is pivotally fastened to arm 23.

When the motor is started the crank arm 25 moves in a circle and carries the upper end of rod 26a with it, raising and lowering the figure 43, and causing the rocking of the rod 28 and the figure 42. After a few cycles, the entire arrangement of rods is set into oscillatory motion, simulating the action of acrobatic performers and creating an interesting and eye-catching animated display. Variations in and control of the movement can be effected by changing the weight and position of the component 47.

The display shown in FIG. 4 produces a simpler oscillatory movement because the joint between bar 23 and the rod 28 is a rigid one effected by a means such as that shown in FIG. 5. This display includes the figure of a man whose body is secured to the rod 28 by two fastening means 50 and 51. Two arms 52 and 53 are pivotally mounted on the body and each contains an additional pivotal joint at a position simulating an elbow. Flags 54 and 55 are secured at the end of each arm. The ends of the arms 52 and 53 are also pivotally secured to the cross rod 27. When the motor is running and the crank arm 25 is rotating, the rod 27, which is pivoted to the rod 28 adjacent the lower end thereof is swung about that pivot by the action of the rod 26, also pivoted adjacent its end to the rod 27. When the motor is running and the crank arm 25 is rotating, this causes the flags 54 and 55 to move up and down to indicate a signalling operation. Such movement is generally shown in FIG. 4 where the full lines indicate the positions of the components when the crank arm 25 is in its lowest position and the dotted lines indicate the positions of the movable components when the crank arm 25 is in its highest position. It should also be noted that the flags not only move up and down but, besides that, are given an arcuate movement due to the compound motion of the arms. Other members such as an extra rod 56 may be used on either side of the display for carrying signs, additional figures or placards having advertising material thereon.

Many other forms, shapes and sizes of displays may be adapted to the rod structure described above. Various combinations of rigid and flexible connections of the rods may be effected and a wide variety of movements may be effected. Thus an overall wide variety of displays can be effected in simple, economical manner while still employing the same basic operating arrangement.

Speaking more generally, it is to be understood that since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In animated display construction, a support, a first rod suspended from and extending generally downwardly with respect to said support, means carried by said support and engaging said rod for imparting oscillating movement thereto in a single plane, said oscillating movement imparting means being mounted for operation in a plane parallel to the plane of movement of said first rod, a second rod suspended from and extending generally downwardly from and with respect to said support in spaced relation with respect to said first rod, a third rod lying below the supported position of said first and second rods, means detachably and pivotally interconnecting said third rod with said first two rods and said third rod deriving movement from said first rod, and said interconnection of said first and third rods providing for movement of said first and third rods in parallel planes, said rods being formed for the securement of display means thereto at different positions along the lengths thereof, said display means being detachably and swingably secured to one of said rods for movement in a plane parallel to the planes of movement of said first and third rods.

2. Animated display construction as in claim 1, said second rod being fixedly secured to the said support.

3. Animated display construction as in claim 1, said second rod being pivotably mounted with respect to said support for swinging movement in a plane parallel to the planes of movement of said first and third rods.

4. Animated display construction as in claim 1, said display means having a portion thereof fixedly connected with respect to another of said rods to move therewith.

5. Animated display construction as in claim 1, said rods being formed with perforations therethrough at spaced positions throughout the lengths thereof and the detachably and pivotally interconnecting means between said rods including said perforations.

References Cited in the file of this patent

UNITED STATES PATENTS

| | | |
|---|---|---|
| 1,638,467 | Barie | Aug. 9, 1927 |
| 1,792,521 | Wilson | Feb. 17, 1931 |
| 1,953,272 | Smith | Apr. 3, 1934 |
| 2,045,675 | Phillips | June 30, 1936 |